United States Patent
Zuckerberg et al.

(10) Patent No.: US 8,171,128 B2
(45) Date of Patent: May 1, 2012

(54) COMMUNICATING A NEWSFEED OF MEDIA CONTENT BASED ON A MEMBER'S INTERACTIONS IN A SOCIAL NETWORK ENVIRONMENT

(75) Inventors: Mark Zuckerberg, Palo Alto, CA (US); Andrew Bosworth, Palo Alto, CA (US); Chris Cox, Palo Alto, CA (US); Ruchi Sanghvi, Palo Alto, CA (US); Matt Cahill, Sunnyvale, CA (US)

(73) Assignee: Facebook, Inc., Palo Alto, CA (US)

( * ) Notice: Subject to any disclaimer, the term of this patent is extended or adjusted under 35 U.S.C. 154(b) by 0 days.

(21) Appl. No.: 11/503,037

(22) Filed: Aug. 11, 2006

(65) Prior Publication Data
US 2008/0040474 A1    Feb. 14, 2008

(51) Int. Cl.
*G06F 15/173* (2006.01)
(52) U.S. Cl. ......................... 709/224; 707/702
(58) Field of Classification Search ............... 709/224, 709/204
See application file for complete search history.

(56) References Cited

U.S. PATENT DOCUMENTS

| | | | |
|---|---|---|---|
| 5,937,413 A | 8/1999 | Hyun | |
| 6,029,141 A | 2/2000 | Bezos | |
| 6,029,195 A * | 2/2000 | Herz | 725/116 |
| 6,513,069 B1 * | 1/2003 | Abato et al. | 709/238 |
| 6,816,850 B2 | 11/2004 | Culliss | |
| 7,013,292 B1 | 3/2006 | Hsu | |
| 7,249,123 B2 | 7/2007 | Elder | |
| 7,269,590 B2 | 9/2007 | Hull | |
| 7,496,603 B2 * | 2/2009 | Deguchi et al. | 1/1 |
| 7,599,935 B2 | 10/2009 | La Rotonda et al. | |
| 7,792,815 B2 * | 9/2010 | Aravamudan et al. | 707/708 |
| 7,809,709 B1 * | 10/2010 | Harrison, Jr. | 707/707 |
| 7,810,037 B1 | 10/2010 | Edwards et al. | |
| 7,827,208 B2 | 11/2010 | Bosworth et al. | |
| 2001/0037721 A1 | 11/2001 | Hasegawa | |
| 2002/0059201 A1 | 5/2002 | Work | |
| 2003/0145093 A1 | 7/2003 | Oren | |
| 2003/0222918 A1 * | 12/2003 | Coulthard | 345/780 |
| 2003/0225632 A1 | 12/2003 | Tong | |
| 2004/0024846 A1 | 2/2004 | Randall | |
| 2004/0088177 A1 | 5/2004 | Travis | |

(Continued)

OTHER PUBLICATIONS

Flores, Fernando et al. "Computer systems and the design of organizational interaction." In ACM Transactions on Information Systems (TOIS), vol. 6, Issue 2, Apr. 1988.

(Continued)

*Primary Examiner* — Patrice Winder
*Assistant Examiner* — Tauqir Hussain
(74) *Attorney, Agent, or Firm* — Fenwick & West LLP

(57) ABSTRACT

A system and method provides dynamically selected media content to someone using an electronic device in a social network environment. Items of media content are selected for the user based on his or her relationships with one or more other users. The user's relationships with other users are reflected in the selected media content and its format. An order is assigned to the items of media content, for example, based on their anticipated importance to the user, and the items of media content are displayed to the user in the assigned order. The user may change the order of the items of media content. The user's interactions with media content available in the social network environment are monitored, and those interactions are used to select additional items of media content for the user.

24 Claims, 5 Drawing Sheets

U.S. PATENT DOCUMENTS

| | | | |
|---|---|---|---|
| 2004/0148275 A1* | 7/2004 | Achlioptas | 707/3 |
| 2005/0021750 A1* | 1/2005 | Abrams | 709/225 |
| 2005/0114759 A1 | 5/2005 | Williams | |
| 2005/0154639 A1 | 7/2005 | Zetmeir | |
| 2005/0159970 A1* | 7/2005 | Buyukkokten et al. | 705/1 |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1* | 9/2005 | Bezos et al. | 705/26 |
| 2005/0216300 A1* | 9/2005 | Appelman et al. | 705/1 |
| 2005/0216550 A1* | 9/2005 | Paseman et al. | 709/202 |
| 2005/0235062 A1 | 10/2005 | Lunt | |
| 2005/0256756 A1* | 11/2005 | Lam et al. | 705/10 |
| 2006/0026147 A1* | 2/2006 | Cone et al. | 707/3 |
| 2006/0041543 A1* | 2/2006 | Achlioptas | 707/3 |
| 2006/0042483 A1* | 3/2006 | Work et al. | 101/91 |
| 2006/0048059 A1* | 3/2006 | Etkin | 715/745 |
| 2006/0052091 A1 | 3/2006 | Onyon | |
| 2006/0080613 A1 | 4/2006 | Savant | |
| 2006/0085419 A1 | 4/2006 | Rosen | |
| 2006/0136419 A1* | 6/2006 | Brydon et al. | 707/9 |
| 2006/0143067 A1* | 6/2006 | Calabria | 705/10 |
| 2006/0143183 A1 | 6/2006 | Goldberg | |
| 2006/0161599 A1 | 7/2006 | Rosen | |
| 2006/0184617 A1* | 8/2006 | Nicholas et al. | 709/203 |
| 2006/0190281 A1* | 8/2006 | Kott et al. | 705/1 |
| 2006/0194186 A1 | 8/2006 | Nanda | |
| 2006/0218225 A1 | 9/2006 | Hee Voon | |
| 2006/0229063 A1 | 10/2006 | Koch | |
| 2006/0230061 A1 | 10/2006 | Sample | |
| 2006/0242139 A1* | 10/2006 | Butterfield et al. | 707/5 |
| 2006/0242178 A1* | 10/2006 | Butterfield et al. | 707/100 |
| 2006/0242581 A1 | 10/2006 | Manion et al. | |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0265277 A1* | 11/2006 | Yasinovsky et al. | 705/11 |
| 2006/0271569 A1 | 11/2006 | Fong et al. | |
| 2006/0293976 A1 | 12/2006 | Nam | |
| 2006/0294085 A1 | 12/2006 | Rose et al. | |
| 2007/0050360 A1 | 3/2007 | Hull et al. | |
| 2007/0174389 A1* | 7/2007 | Armstrong et al. | 709/204 |
| 2007/0208916 A1 | 9/2007 | Tomita | |
| 2007/0226314 A1* | 9/2007 | Eick et al. | 709/217 |
| 2007/0250511 A1* | 10/2007 | Endler et al. | 707/10 |
| 2007/0255831 A1 | 11/2007 | Hayashi et al. | |
| 2007/0261071 A1* | 11/2007 | Lunt et al. | 725/13 |
| 2007/0266097 A1* | 11/2007 | Harik et al. | 709/204 |
| 2007/0282987 A1* | 12/2007 | Fischer et al. | 709/223 |
| 2008/0005076 A1 | 1/2008 | Payne | |
| 2008/0010343 A1* | 1/2008 | Escaffi et al. | 709/204 |
| 2008/0033776 A1* | 2/2008 | Marchese | 705/8 |
| 2008/0040428 A1 | 2/2008 | Wei | |
| 2008/0070697 A1* | 3/2008 | Robinson et al. | 463/42 |
| 2008/0086458 A1* | 4/2008 | Robinson et al. | 707/3 |
| 2009/0171950 A1* | 7/2009 | Lunenfeld | 707/5 |
| 2010/0057555 A1* | 3/2010 | Butterfield et al. | 705/14.41 |

OTHER PUBLICATIONS

Chipin. Chipin: The easy way to collect money [online], Dec. 15, 2006 http://web.archive.org/web/20061215090739/www.chipin.com/overview.

Parzek, E. Social Networking to Chipin to a Good Cause [online]. Business Design Studio, Jun. 29, 2006 http://www.businessdesignstudio.com/resources/blogger/2006/06social-networking-tochipin-to-good.html.

U.S. Appl. No. 11/639,655, filed Dec. 14, 2006, Mark Zuckerberg, Systems and Methods for Social Mapping.

U.S. Appl. No. 11/646,206, filed Dec. 26, 2006, Aaron Sittig, Systems and Methods for Generating a Social Timeline.

U.S. Appl. No. 11/493,291, filed Jul. 25, 2006, Mark Zuckerberg, Systems and Methods for Dynamically Generating a Privacy Summary.

U.S. Appl. No. 11/701,698, filed Feb. 2, 2007, Jed Stremel, System and Method for Digital File Distribution.

U.S. Appl. No. 11/713,455, filed Feb. 28, 2007, Jed Stremel, Systems and Methods for Automatically Locating Web-Based Social Network Members.

U.S. Appl. No. 11/701,566, filed Feb. 2, 2007, Jed Stremel, System and Method for Automatic Population of a Contact File with Contact Content and Expression Content.

U.S. Appl. No. 11/502,757, filed Aug. 11, 2006, Andrew Bosworth, Systems and Methods for Generating Dynamic Relationship-Based Content Personalized for Members of a Web-Basaed Social Network.

U.S. Appl. No. 11/503,093, filed Aug. 11, 2006, Andrew Bosworth, Systems and Methods for Measuring User Affinity in a Social Network Environment.

U.S. Appl. No. 11/503,242, filed Aug. 11, 2006, Mark Zuckerberg, System and Method for Dynamically Providing a News Feed About a User of a Social Network.

U.S. Appl. No. 11/499,093, filed Aug. 2, 2006, Mark Zuckerberg, Systems and Methods for Dynamically Generating Segmented Community Flyers.

U.S. Appl. No. 11/580,210, filed Oct. 11, 2006, Mark Zuckerberg, System and Method for Tagging Digital Media.

U.S. Appl. No. 11/893,493, filed Aug. 15, 2007, Arieh Steinberg, Web-Based Social Network Badges.

U.S. Appl. No. 11/982,974, filed Nov. 5, 2007, Ruchi Sanghvi, Systems and Methods for a Web-Based Social Networking Environment Integrated Within One or More Computing and/or Networking Applications.

U.S. Appl. No. 11/701,595, filed Feb. 2, 2007, Ezra Callahan, System and Method for Determining a Trust Level in a Social Network Environment.

U.S. Appl. No. 11/726,962, filed Mar. 23, 2007, Charlie Cheever, System and Method for Confirming an Association in a Web-Based Social Networking.

U.S. Appl. No. 11/701,744, filed Feb. 2, 2007, Andrew Bosworth, System and Method for Curtailing Objectionable Behavior in a Web-Based Social Network.

U.S. Appl. No. 11/796,184, filed Apr. 27, 2007, Jared S. Morgenstem, System and Method for Giving Gifts and Displaying Assets in a Social Network Environment.

U.S. Appl. No. 11/893,797, filed Aug. 16, 2007, Yun-Fang Juan, System and Method for Invitation Targeting in a Web-Based Social Network.

U.S. Appl. No. 11/893,820, filed Aug. 16, 2007, Yun-Fang Juan, Systems and Methods for Keyword Selection in a Web-Based Social Network.

U.S. Appl. No. 11/899,426, filed Sep. 5, 2007, Jared Morgenstem, System and Method for Collectively Giving Gifts in a Social Network Environment.

U.S. Appl. No. 12/072,003, filed Feb. 21, 2008, Arieh Steinberg, Systems and Methods for Implementation of a Structured Query Lnaguage Interface in a Distributed Database Environment.

U.S. Appl. No. 12/077,070, filed Mar. 13, 2008, Dave Fetterman, Systems and Methods for Network Authentication.

U.S. Appl. No. 12/154,504, filed May 23, 2008, Adam D'Angelo, Personalized Platform for Accessing Internet Applications.

U.S. Appl. No. 12/156,091, filed May 28, 2008, Mark Zuckerberg, Systems and Methods for Auction Based Polling.

U.S. Appl. No. 12/151,734, filed May 7, 2008, Jared Morgenstem, Systems and Methods for Classified Advertising in an Authenticated Web-Based Social Network.

U.S. Appl. No. 12/154,886, filed May 27, 2008, Nico Vera, Systems and Methods for Providing Privacy Settings for Applications Associated with a User Profile.

U.S. Appl. No. 60/965,624, filed Aug. 20, 2007, Adam D'Angelo, Systems and Methods for Targeting Advertisements in a Social Network Environment.

U.S. Appl. No. 11/893,559, filed Aug. 15, 2007, Adam D'Angelo, Platform for Providing a Social Context to Software Applications.

U.S. Appl. No. 60/967,842, filed Sep. 7, 2007, Ezra Callahan, Systems and Methods for Dynamically Updating Privacy Settings.

U.S. Appl. No. 60/966,442, filed Aug. 28, 2007, Ezra Callahan, System and Method for Incorporating an Entity or Group other than a Natural Person into a Social network.

U.S. Appl. No. 60/965,852, filed Aug. 22, 2007, Adam D'Angelo, Systems and Methods for Advertising.

U.S. Appl. No. 61/005,614, filed Dec. 5, 2007, Yishan Wong, Systems and Methods for Community Translations on a Web-Based Social Network.

U.S. Appl. No. 12/080,808, filed Apr. 2, 2008, Peter Deng, Systems and Methods for Calendaring.

PCT International Search Report and Written Opinion, PCT/US2007/017574, Jul. 14, 2008.

China State Intellectual Property Office First Office Action, Application No. 2007-800340213, Feb. 12, 2010, six pages.

European Patent Office Examination Report, European Patent Application No. 07836589.7, Mar. 26, 2010, one page.

European Patent Office Extended European Search Report, European Patent Application No. 07836589.7, Dec. 23, 2009, four pages.

PCT International Search Report and Written Opinion, PCT Application No. PCT/US2007/017572, Jun. 20, 2008, eight pages.

Australian Patent Office, Examiner's First Report, Patent Application No. 2007-284811, May 25, 2011, two pages.

Australian Patent Office, Examiner's First Report, Patent Application No. 2007-284813, Jun. 30, 2011, two pages.

China State Intellectual Property Office, Second Office Action, Chinese Patent Application No. 2007-80034021.3, Oct. 28, 2011, seven pages.

\* cited by examiner

COMMUNICATING A NEWSFEED OF MEDIA CONTENT BASED ON A MEMBER'S INTERACTIONS IN A SOCIAL NETWORK ENVIRONMENT

CROSS-REFERENCE TO RELATED APPLICATIONS

The present application incorporates by reference U.S. application Ser. No. 60/750,844, filed on Dec. 14, 2005, for "Systems and Methods for Social Mapping," U.S. application Ser. No. 60/753,810, filed on Dec. 23, 2005, for "Systems and Methods for Social Timeline," U.S. application Ser. No. 11/493,291, filed on Jul. 25, 2006, for "Systems and Methods for Dynamically Generating a Privacy Summary," U.S. application Ser. No. 11/502,757, filed on Aug. 11, 2006, for "Systems and Methods for Generating Dynamic Relationship-Based Content Personalized for Members of a Web-Based Social Network," U.S. application Ser. No. 11/503,093, filed on Aug. 11, 2006, for "Systems and Methods for Measuring User Affinity in a Social Network Environment," and U.S. application Ser. No. 11/503,242, filed on Aug. 11, 2006, for "System and Method for Dynamically Providing a News Feed About a User of a Social Network."

BACKGROUND OF THE INVENTION

1. Field of the Invention

The present invention relates generally to media presentation, and more particularly to systems and methods for presenting dynamically selected media content to a user of an electronic device in a social network environment.

2. Description of Related Art

Conventionally, users of networking websites connect with other users and provide information about themselves. For example, a user may post contact information, background information, current job position, hobbies, and so forth. Other users may contact the posting user based on common interests, or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users.

There are existing mechanisms that allow a user to display information about other users. Some mechanisms may allow the user to select particular items of media content for immediate viewing. Typically, however, these items of media content are disparate and disorganized. In other words, the user must spend time researching a topic by searching for, identifying, and reading individual items of media content that are not presented in a coherent, consolidated manner. Further, often the user remains unaware of the existence of some items of media content that were not captured in the user's research. For example, in a typical social networking environment, one would have to look up another user and click on various links to find information about the other user.

In addition, there are news feeds to which one can subscribe that can provide information on a particular topic via automatic download to an electronic device associated with a user. However, the downloaded information is not selected and presented based on the user's relationships with other users, and does not occur within the context of a social network. What is desired is a way for a user of a social network automatically to receive items of media content that are dynamically selected and presented to the user based on his relationships with other users.

SUMMARY OF THE INVENTION

The present invention provides a system and method for providing dynamically selected media content to a user of an electronic device in a social network environment. Items of media content are selected for the user based on his or her relationships with one or more other users. The user's relationships with other users are reflected in the selected media content and its format. An order may be assigned to the selected items of media content, for example, based on their importance to the user, and the items of media content displayed to the user in that order. The user may change the order of the items of media content. The user's interactions with the items of media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user. The results of this analysis are used to select, consolidate and tailor content for news stories to be presented to the user in a personalized, dynamic news feed that may be more interesting or desirable to the user because of its selection based upon the user's personal relationships.

DETAILED DESCRIPTION OF THE INVENTION

A system and method is provided for presenting dynamically selected media content to a user of an electronic device in a social network environment. Items of media content are selected for the user based on his or her relationships with one or more other users, with whom the user is associated through a social network provider. The user's relationships with other users are reflected in the selected media content and its format. For example, media content concerning the user's brother, wife, or best friend from college may be presented to the user as being about "your brother," "your wife" and "your best friend from college," respectively. Accordingly, the media content dynamically selected for and presented to the user is personalized in a way that would be less meaningful or interesting if viewed by someone other than the user.

An order is assigned to the selected media content, for example, based on its importance to the user, and the media content is displayed to the user in the assigned order. The user may change the order of the items of media content, for example, via a separate settings display that allows the user to prioritize and/or filter certain items of media content, and/or also by using a "drag-and-drop" function to organize stories dynamically on the media content display. The user's interactions with the media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user as reflected in the descending order of the frequency of the user's interaction with other users. In a display according to such an embodiment, the results of this analysis are used to select, consolidate and tailor content for news stories to be presented to the user in a personalized, dynamic news feed that is more meaningful to the user because of its basis in the user's personal relationships.

Figure 1:
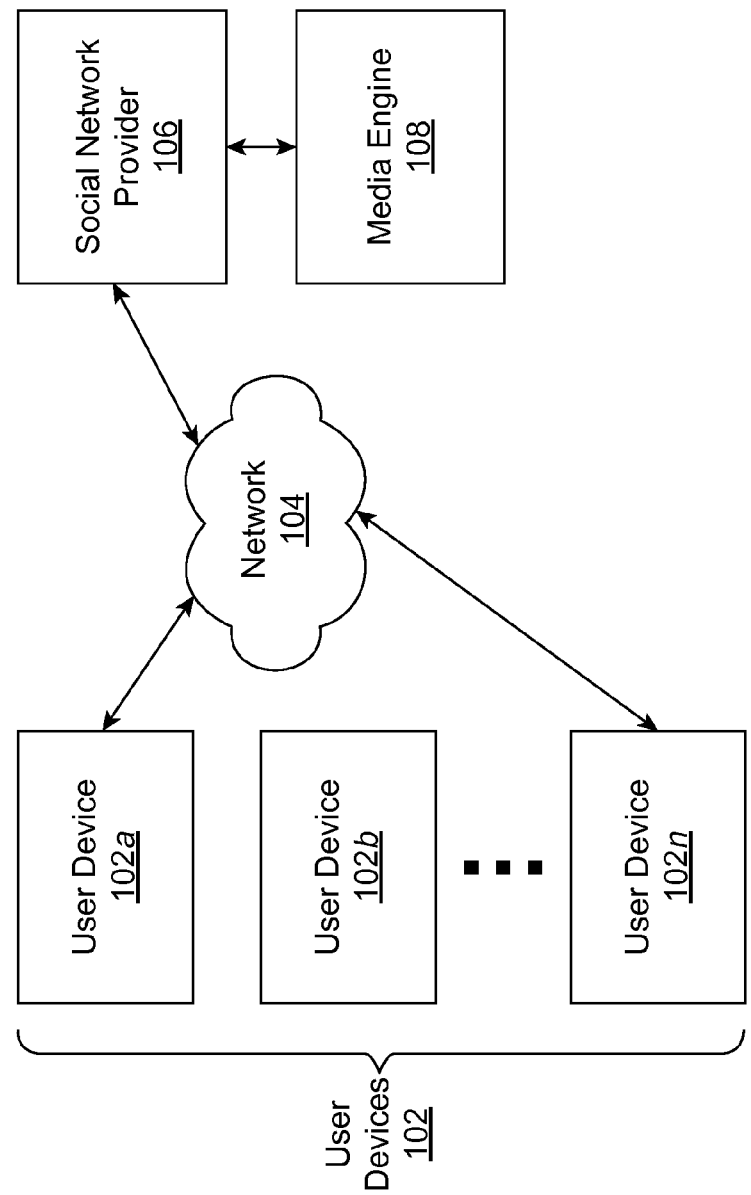
FIG. 1 is a diagram of an exemplary architecture for providing dynamically selected media to a user of an electronic device in a social network environment.

FIG. 1 is a diagram of an exemplary architecture for presenting dynamically selected media to a user of an electronic device in a social network environment. User devices 102, such as a user device 102a, a user device 102b, and a user device 102n, communicate over a network 104 with a social network provider 106. The user devices 102a-102n may comprise any device associated with one or more users, such as a cellular telephone, a personal digital assistant, a desktop or a laptop computer, and so forth. Any types of user devices 102 are within the scope of various embodiments.

The social network provider 106 may comprise any user or entity that provides social networking services, communication services, dating services, and so forth. For example, the social network provider 106 may host a website that allows one or more users at the user devices 102 to communicate with one another via the website. In one instance, the user associated with the user device 102a may communicate with the user associated with the user device 102b via a social networking website associated with the social network provider 106 that offers the user an opportunity to connect or reconnect with one or more other users that attended, for example, the same university as the user.

A media engine 108 is coupled to the social network provider 106. In one embodiment, the media engine 108 can select items of media content based on the user's relationships with other users through the social network provider 106. The media engine 108 analyzes the frequency of the user's interactions with other users through the social network provider 106 and with the selected items of media. The results of this analysis are used to rank the importance of the other users to the user, so that new items of media content are selected and displayed to the user in the order of the content's anticipated importance or interest to the user.

For example, a user at the user device 102a uses a cursor to click on items of media content related to his sister Abby very frequently, and to click on emails from his friend Bob somewhat less frequently. The items of media content selected by the media engine 108 will be dynamically presented to the user at the user device 102a with an importance ranking based on an analysis of the frequencies of the user's interactions with items of media content associated with his friends, so that items of media content associated with Abby will be presented first to the user at the user device 102a, followed by items of media content associated with Bob. For example, the items of media content may be news stories about the other users Abby and Bob. Such news stories would be presented to the user as stories about "your sister" and "your best friend," so that the wording and content of the stories would not be meaningful to someone other than the users.

In an embodiment not shown, the media engine 108 can receive media content preference settings selections from the users at the user devices 102. The media engine 108 can save the media content preference settings to a profile associated with each user. Once the media content preference settings are selected by the user, the media engine 108 can use the media content preference settings to insure that items of media content concerning particular relationships between the user and other users are not displayed to the user.

The users at the user devices 102 can group other users, events or objects according to categories, such as "friends", "school", "geography", "business", and so forth, and select a media content preference setting applicable to an entire category; any type of grouping may be employed by the user and/or the social network provider 106. Further, according to some embodiments, the user may make media content preference settings applicable to individual other users, events or objects. For instance, the user may select media content preference settings for Jane, media content preference settings for John, and/or media content preference settings for groups of users, which may or may not include Jane and John.

Figure 2:
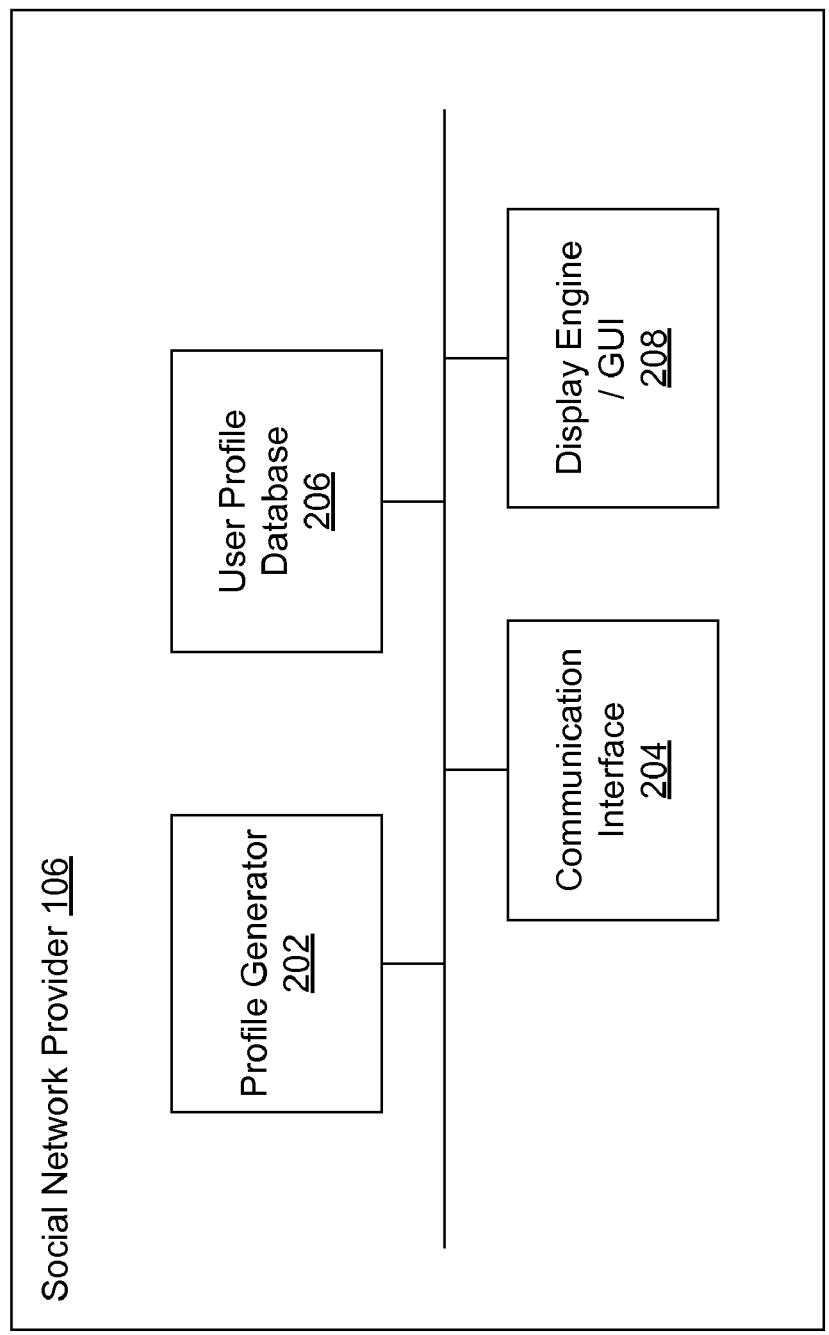
FIG. 2 is a block diagram of an exemplary social network provider.

Referring now to FIG. 2, a block diagram of an exemplary system for providing a social network 106 is illustrated. The social network provider 106 may comprise a server, a client device, or any other device.

The social network provider 106 includes a profile generator 202 for creating the profile for the user, as discussed herein. For example, the user may provide contact information, friends, photos, and so forth to associate with the profile for the user. The profile generator 202 utilizes the information provided by the user to create the profile (i.e., the user profile). As discussed herein, the profile may include one or more categories or subcategories and news priority settings selections may be provided for each of the one or more categories or subcategories.

The social network provider 106 includes a communications interface 204 for communicating with the user devices 102, such as the user devices 102a-102n described herein, over the network 104. The user devices 102 communicate various types of information, such as media content preference settings selections, groupings of other users, and so forth to the social network provider 106 via the communications interface 204. Any type of communications interface 204 is within the scope of various embodiments.

A user profile database 206 is provided for storing data associated with each of the users, such as the users associated with the user devices 102a-102n, in the user profiles created by the profile generator 202. When the users at the user devices 102 select media content preference settings to associate with their user profiles, the user profile database 206 updates the user data associated with each user profile. Accordingly, the media content preference settings selections are stored in association with each user profile. The user profiles and/or the media content preference settings selections may be stored, modified, added, and so forth to any storage medium, according to some embodiments.

A display engine/GUI 208 may also be provided by the social network provider 106. The display engine/GUI 208 displays dynamically selected items of media, the user's profile, and so forth to a user of an electronic device in a social network environment to the users associated with the user devices 102. The users can interact with the social network provider 106 via the display engine/GUI 208. For example, the users can access the dynamically selected items of media, their own user profile, other items of media content available via the social network provider, select media content preference settings, and so forth via the display engine/GUI 208.

Although the social network provider 106 is described as being comprised of various components (the profile generator 202, the communications interface 204, the user profile database 206, and the display engine/GUI 208), fewer or more components may comprise the social network provider 106 and still fall within the scope of various embodiments.

Figure 3:
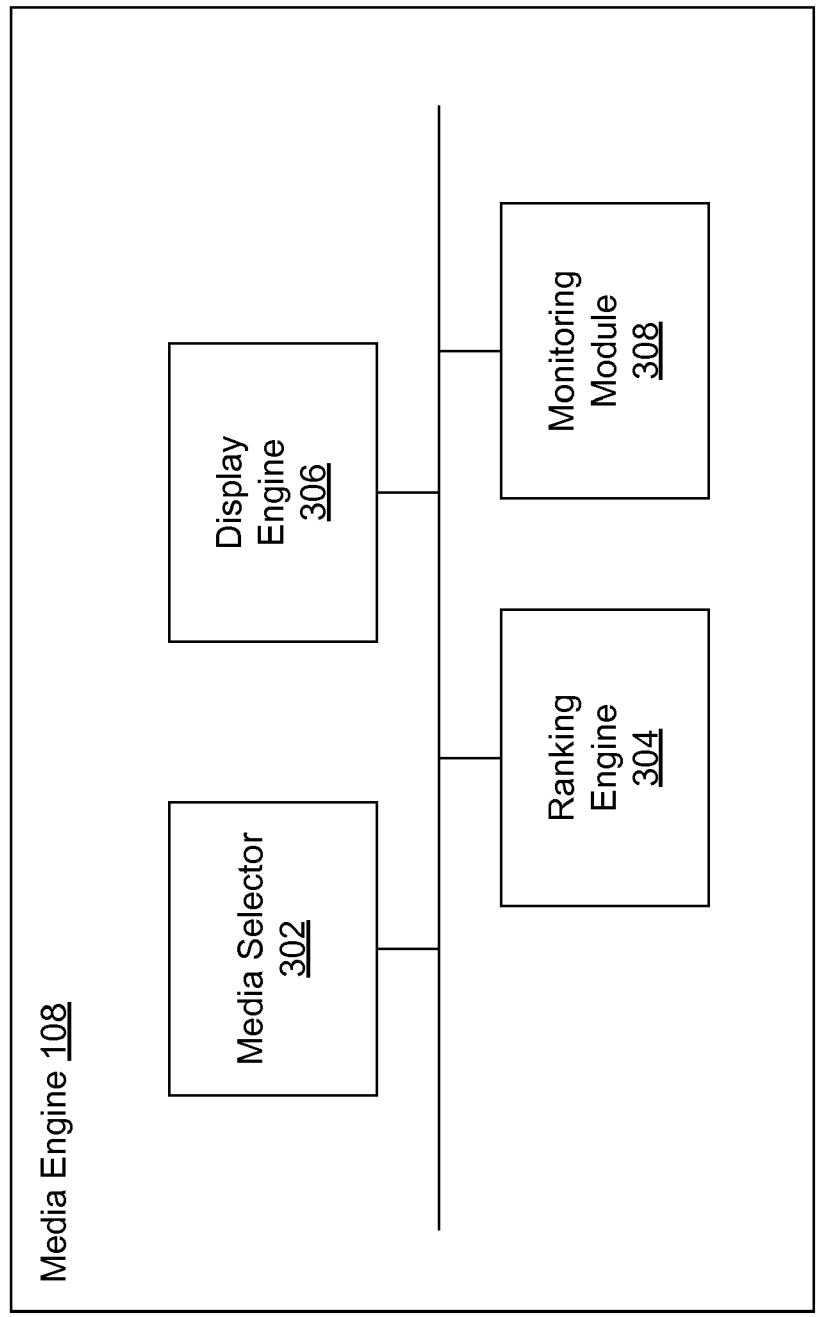
FIG. 3 is a block diagram of an exemplary media engine.

FIG. 3 is a block diagram of an exemplary media engine 108. A media selector 302 gathers items of media content available through the social network provider, consolidates them and prepares them for presentation to the user. For example, the media selector 302 finds four items of media content associated with Abby and six items of media content associated with Bob, arranges them in the order provided by the ranking engine 304, formats them in language intelligible only to the user as discussed above, and presents them to the user via the display engine 306.

For example, in some embodiments the media selector 302 can identify items of media content associated with relationships, events or objects that receive high rankings from the ranking engine 304, locate information related to the items of media content associated with the 20 relationships, events or objects of greatest interest to the user, and consolidate that information into content for personalized, dynamic presentation on those 20 topics.

A ranking engine 304 analyzes the frequency of user actions associated with particular relationships, events and objects, or categories or subcategories of relationships, events or objects made available via the social network provider 106. According to some embodiments, the ranking engine 304 comprises a database or other storage medium that stores user interaction data. Alternatively, the monitoring module 308 comprises a database or other storage medium that stores user interaction data. The ranking engine 304 examines the user interaction data, uses an algorithm to weight the items of media content associated with relationships, events and objects, individually and/or in categories relative to the frequency of user interaction with these items of media. The ranking engine 304 orders the items of media content based on the measured frequencies of user interaction, generating a list of the items of media content reflecting their importance to the user. For example, the items of media content may be arranged in descending order of their importance to the user, in that a highest frequency of user interactions with items of media content associated with a particular relationship results in items of media content pertaining to that relationship being listed first. Alternatively, any algorithm could be used by the ranking engine, to generate other orders for the items of media content on other bases. In some embodiments, the order generated for the items of media content is based on the user affinity described in U.S. application Ser. No. 11/503, 093, cited above.

Because user interest may vary over short and long timescales, the weighting may change as a function of time in some embodiments. For example, a user planning a trip may be very interested in news of other users who have traveled recently, in news of trips identified as events by other users, and in travel information, and then be much less interested in these relationships, events, objects, or categories or subcategories thereof upon his return. Thus, items of media content associated with another user who has traveled recently may receive a large weighting relative to other items of media, and the weighting will decay steeply so that the weighting is low by the time of the user's return. Alternatively, the weighting associated with individual relationships, events and objects, or categories or subcategories thereof that are of long-term interest may remain steadily high.

A display engine 306 receives the consolidated, ordered items of media content from the media selector 302 and creates a presentation of personalized, dynamically selected media that may be most meaningful to the user because of its basis in the user's personal relationships. For example, the display engine 306 may personalize a media item topic heading to information about a particular relationship, such as that between the user and his brother, and modify the content of the media item so that it is about "your brother." Any number of such translations may be used to tailor the display to the user based on his relationships with other users. In some embodiments, the presentation of personalized, dynamically selected media that may be most meaningful to the user because of its basis in the user's personal relationships may be formatted by the media selector 302, and forwarded with modifications completed to the display engine 306.

According to some embodiments, the display engine 306 comprises a database or other storage medium that stores translation data, which the display engine 306 accesses in order to create a personalized, dynamic news feed, which immediately informs the user of any new items of media content introduced to the social network environment that may be of interest to the user. The display engine 306 may then forward the news feed to the display engine/GUI 208 for display to the user associated with the particular news feed display. The immediately updated display is discussed in further detail in association with FIG. 4. In some embodiments, the media selector 302 comprises the database or other storage medium that stores translation data. In some embodiments, the display engine/GUI 208 may be identical with the display engine 306.

A monitoring module 308 tracks user interactions with items of media content made available via the social network provider 106 to determine which relationships, events and objects are most interesting to the user by measuring the frequency of the user's interactions with the items of media content available through the social network provider. The frequency of user actions associated with particular relationships, events and objects, or categories or subcategories of relationships, events or objects is recorded. According to some embodiments, the monitoring module 308 comprises a database or other storage medium that stores interaction data, which the ranking engine 304 accesses so that the ranking engine 304 can order the items of media content based on the measured frequencies of user interaction, generating a list of the items of media content reflecting their importance to the user. For example, the monitoring module can count the number of times the user accesses email from his brother, or the number of times the user clicked on dynamically selected items of media content reflecting news about his best friend.

Figure 4:
FIG. 4 is an exemplary media display screen, such as might be displayed to a user in a social network environment.

FIG. 4 shows an exemplary presentation screen 400 of dynamically selected media content to a user of an electronic device in a social network environment. As discussed herein, the presentation 400 of personalized, dynamically selected media content utilizes the user action analysis generated by the ranking engine 304 to present news gathered by the media selector 302 and organized by the ranking engine 304 (or alternatively, organized by the media selector 302) to the user in a coherent, up-to-date form for easy comprehension. Further, the news has been processed to minimize redundancy and presented in a narrative form by the media selector 302 or alternatively, by the display engine 306. (In FIG. 4 neither Brittney nor Megan has a special relationship with the user. As discussed herein, if desired, the screen could say, "your sister" for Brittney, or "your best friend" for Megan, for example.)

Four dynamically selected items of media content based on the user's relationships with other users 402 are displayed. In the presentation 400 in FIG. 4, the user's most important relationships are with Megan, Brittney and the group Country Music Listeners. The weighting of user interactions with items of media content associated with these relationships resulted in the item of media reflecting two of these three most important relationships being presented at the top of the display, followed by items of media content (here, news stories) about Megan, then other news stories about Brittney.

As discussed herein, the display engine/GUI 208 may display the presentation 400. Further, as also discussed herein, the user may input selections for various media content preference setting selections associated with one or more relationships associated with items of media content in the social network environment. Accordingly, the user profile database 208 is updated with the user's media content preference setting selections for each relationship. The user interaction analysis and the user profile are utilized by the media selector 302 to create the presentation of personalized, dynamically selected media. The display engine/GUI 306 is then utilized to display the personalized, dynamic news feed to the user, in order to keep the user up to date on relationships, events and objects of interest to the user as indicated by the media content preference setting selections chosen by the user and the analysis selected by the ranking engine 304.

Figure 5:
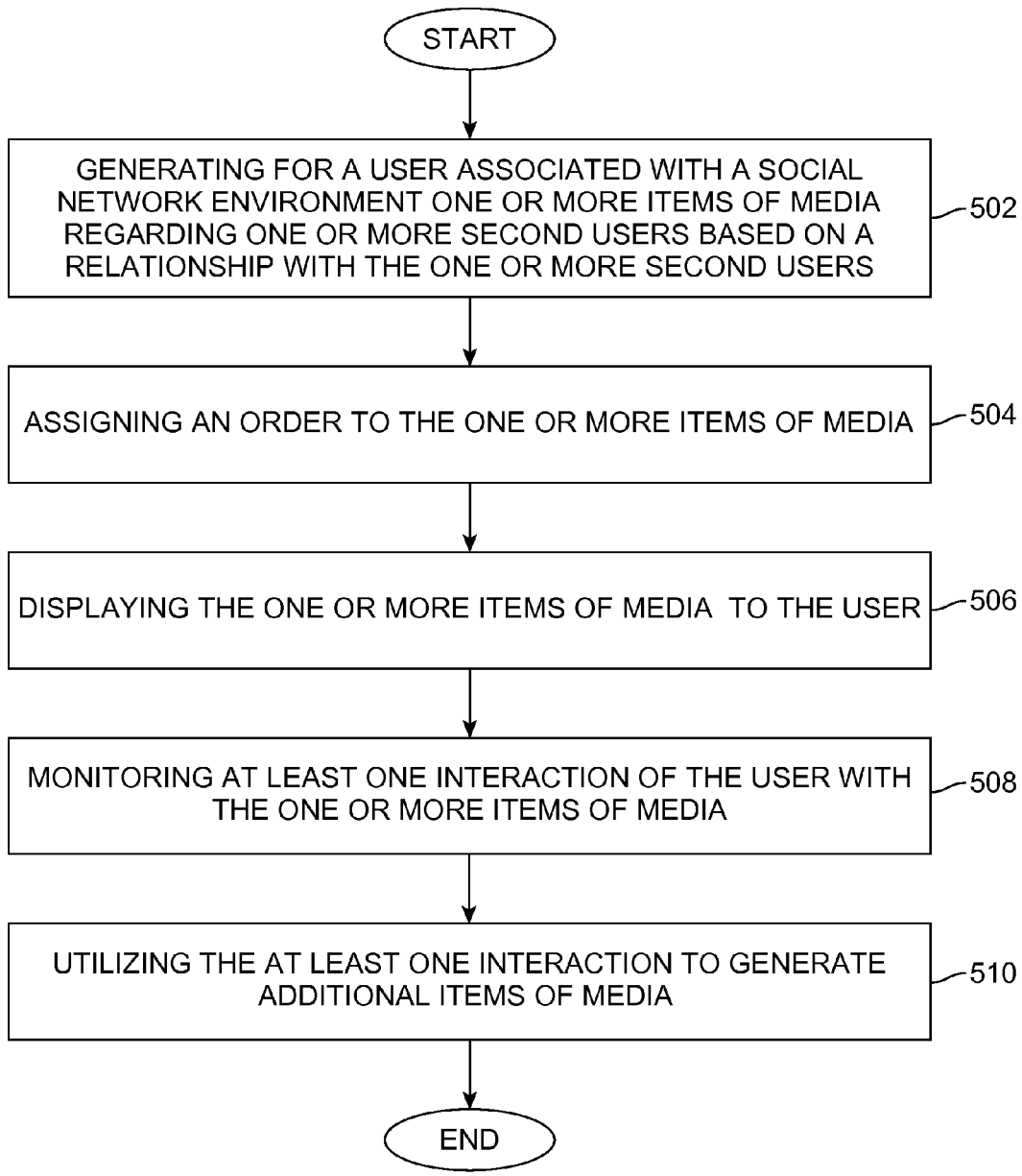
FIG. 5 is a flow chart of an exemplary process for providing dynamically selected media to a user of an electronic device in a social network environment.

FIG. 5 illustrates a flow diagram of an exemplary process for providing dynamically selected media to a user of an electronic device in a social network environment. At step 502 one or more items of media content regarding one or more second users based on a relationship with the one or more second users is selected for a user associated with a social network environment. As discussed herein, the relationship may include relationships with one or more individual users, or relationships with categories of users such as those in a geographical location network, a college network, and so forth. The items of media content may include one or more categories or subcategories, such as photos, event notices, invitations, bulletin board postings, contact information, emails, and so forth.

At step 504, an order is assigned to the one or more items of media content selected for the user. As discussed herein, a user action analysis is generated by tracking user actions and recording the frequencies of those actions with items of media content associated with various relationships, and ranking the various relationships in importance to the user. For example, a user interested in learning about the activities of his favorite group, such as a group of fellow college alumni near a reunion date, may click on items of media content associated with fellow college alumni with high frequency over a few days or weeks. The high-frequency of user action associated with fellow college alumni will result in a rank of high importance to the user for items of media content associated with fellow college alumni. In some embodiments not shown, the user may change the order of the items of media content, for example, via a separate settings display that allows the user to prioritize and/or filter certain items of media content, and/or also by using a "drag-and-drop" function to organize stories dynamically on the media content display.

At step 506 the one or more items of media content are displayed to the user in a consolidated, tailored form based on the order determined by the user interaction analysis. In the example discussed in the preceding paragraph, items of media content associated with fellow college alumni will be presented near the top of the display.

At step 508, at least one interaction of the user with items of media content in the social network environment is monitored. These items of media content may be from those selected by the media selector 302, but may also be any other media content available through the social network provider 106 accessed or viewed by the user. As discussed herein, the monitored frequencies of user interactions with items of media content associated with the user's relationships with other users are provided to the ranking engine to determine the order in which items of media content should be presented to the user. In one embodiment, the monitored interaction is with items of media content in the social network environment that has not been previously selected for the user.

At step 510, the monitoring of the at least one interaction of the user with items of media content in the social network environment is utilized to select additional items of media content for dynamic presentation to the user. As discussed herein, in some embodiments the ranked items of media content are converted into a news feed display, such as the exemplary presentation 400 illustrated in FIG. 4. The presentation 400 may combine content from the one or more relationships, networks, categories, and/or subcategories into one or more items of media content or categories of items of media.

Embodiments of this invention may also include a computer readable medium having embodied thereon a program, the program being executable by a processor for performing a method, as described herein, for providing dynamically selected media content to a user of an electronic device in a social network environment.

While various embodiments have been described above, it should be understood that they have been presented by way of example only, and not limitation. For example, any of the elements associated with the dynamically selected media presentation may employ any of the desired functionality set forth hereinabove. Thus, the breadth and scope of a preferred embodiment should not be limited by any of the above-described exemplary embodiments.

What is claimed is:

1. A method for communicating a social networking system newsfeed based on a user's interactions, the method comprising:

storing in a database a user profile for a viewing user of a social network system, the user profile including an identification of a plurality of other users of the social network with whom the viewing user has established a connection;

generating a plurality of news stories about one or more other users of the social network system, at least one of the news stories comprising a description about an action taken by at least one of the other users of the social networking system with whom the viewing user has established a connection;

generating a newsfeed that comprises a plurality of the generated news stories about the other users of the social network system with whom the viewing user has established a connection, wherein the plurality of generated news stories are selected for the newsfeed based on the viewing user's affinity for content in the news stories;

sending the newsfeed comprising the news stories to a user device for display to the viewing user;

monitoring one or more interactions of the viewing user of the social network system, wherein the monitored interactions are between the viewing user and at least one of: another user of the social network system, and media content in the social network system;

updating the newsfeed to include one or more additional news stories selected based on the monitored interactions, at least one of the additional news stories comprising a description about an action taken by at least one of the other users of the social network system with whom the viewing user has established a connection; and sending the updated newsfeed comprising the selected additional news stories to the user device for display to the viewing user in an order that is based at least in part on the viewing user's affinity for the selected additional news stories.

2. The method as recited in claim 1, wherein the monitored interaction is with one or more items of media content contained in a news story selected for the viewing user.

3. The method as recited in claim 1, wherein the monitored interaction is with one or more items of media content in the social network system outside of a news story that has been previously selected for the viewing user.

4. The method as recited in claim 1, wherein the monitored interaction includes the viewing user's interaction with an email.

5. The method as recited in claim 1, further comprising allowing the viewing user to select newsfeed preference settings.

6. The method as recited in claim 5, further comprising utilizing the viewing user's selected newsfeed preference settings to select the plurality of news stories.

7. The method as recited in claim 6, further comprising utilizing the viewing user's selected newsfeed preference settings to assign an order to the plurality of news stories.

8. The method as recited in claim 1, further comprising allowing the viewing user to assign an order to the plurality of news stories.

9. The method as recited in claim 1, wherein the additional news stories include an updated news story.

10. A system for communicating a social networking system newsfeed based on a user's interactions, the system comprising:
a user profile database storing a user profile for a viewing user of a social network, the user profile including an identification of a plurality of other users of the social network system with whom the viewing user has established a connection;
a communications interface configured to generate news stories about the plurality of other users of the social network system, at least one of the news stories comprising a description about an action taken by at least one of the other users of the social networking system with whom the user has established a connection;
a media selector configured to generate a newsfeed that comprises a plurality of the generated news stories about the plurality of other users of the social network system with whom the viewing user has established a connection, wherein the plurality of generated news stories are selected for the newsfeed based on the viewing user's affinity for content in the news stories;
a display engine, in communication with the media selector, the display engine configured to display the newsfeed comprising the news stories to the viewing user in an order that is based at least in part on the viewing user's affinity for the news stories; and
a monitoring module, in communication with the media selector, the monitoring module configured to monitor one or more interactions of the viewing user of the social network, wherein the monitored interactions are between the user and at least one of:
another user of the social network system, and media content in the social network system;
wherein the media selector is further configured to update the newsfeed to include one or more additional news stories selected based on the monitored interactions, at least one of the additional news stories comprising a description about an action taken by at least one of the other users of the social network system with whom the viewing user has established a connection, and
wherein the display engine is further configured to send the updated news feed comprising the selected one or more additional news stories for display to the viewing user.

11. The system recited in claim 10, wherein the display engine is configured to allow the viewing user to assign an order to the plurality of news stories.

12. The system recited in claim 10, further comprising:
a profile generator configured to create a profile for a user;
wherein the communications interface is configured to receive one or more newsfeed preference setting selections from the viewing user associated with the profile; and
wherein the user profile database is configured to update the profile associated with the user to incorporate the one or more newsfeed preference setting selections.

13. The system recited in claim 10, wherein the media selector is configured to select additional news stories according to the newsfeed preference setting selections.

14. The system recited in claim 10, wherein the display engine is configured to allow the viewing user to assign an order to the plurality of news stories via interaction with the display.

15. A non-transitory computer readable medium having embodied thereon a program, the program being executable by a processor for performing a method for communicating a social network system newsfeed based on a user's interactions, the method comprising:
storing in a database a user profile for a viewing user of a social network system, the user profile including an identification of a plurality of other users of the social network with whom the viewing user has established a connection;
generating a plurality of news stories about one or more other users of the social network system, at least one of the news stories comprising a description about an action taken by at least one of the other users of the social networking system with whom the viewing user has established a connection;
generating a newsfeed that comprises a plurality of the generated news stories about the other users of the social network system with whom the viewing user has established a connection, wherein the plurality of generated news stories are selected for the newsfeed based on the viewing user's affinity for content in the news stories;
sending the newsfeed comprising the news stories to a user device for display to the viewing user;
monitoring one or more interactions of the viewing user of the social network system, wherein the monitored interactions are between the viewing user and at least one of: another user of the social network system, and media content in the social network system;
updating the newsfeed to include one or more additional news stories selected based on the monitored interactions, at least one of the additional news stories comprising a description about an action taken by at least one of the other users of the social network system with whom the viewing user has established a connection; and
sending the updated newsfeed comprising the selected additional news stories to the user device for display to the viewing user in an order that is based at least in part on the viewing user's affinity for the selected additional news stories.

16. The non-transitory computer readable medium recited in claim 15, wherein displaying the news stories comprises displaying the news stories in an order that is based at least in part on the monitored interactions.

17. The non-transitory computer readable medium recited in claim 15, further comprising allowing the viewing user to select newsfeed preference settings.

18. The non-transitory computer readable medium recited in claim 17, further comprising utilizing the viewing user's selected newsfeed preference settings to select the plurality of news stories.

19. The method as recited in claim 1, wherein the plurality of the news stories comprise at least one of: text, an image, and a selectable link to additional media content.

20. The method as recited in claim 1, wherein the monitoring comprises recording the viewing user's actions associated with particular relationships, events or objects, or categories or subcategories of relationships, events or objects, in the social networking environment.

21. The system recited in claim 10, wherein one or more of the news stories comprise at least one of: text, an image, and a selectable link to additional media content.

22. The system recited in claim 10, wherein the monitoring module is configured to record the viewing user's actions associated with particular relationships, events or objects, or categories or subcategories of relationships, events or objects, in the social networking environment.

23. The non-transitory computer readable medium of claim 15, wherein one or more of the news stories comprise at least one of: text, an image, and a selectable link to additional media content.

24. The non-transitory computer readable medium of claim 15, wherein the monitoring comprises recording the viewing user's actions associated with particular relationships, events or objects, or categories or subcategories of relationships, events or objects, in the social networking environment.

* * * * *